Sept. 4, 1951 R. DOUGHERTY 2,566,406
SEED FEEDING DISK WITH EJECTOR BRUSH
Filed June 20, 1949 2 Sheets-Sheet 1

INVENTOR
RUSSELL DOUGHERTY
By Frederick C. Bromley
ATTY

Sept. 4, 1951 R. DOUGHERTY 2,566,406
SEED FEEDING DISK WITH EJECTOR BRUSH
Filed June 20, 1949 2 Sheets-Sheet 2
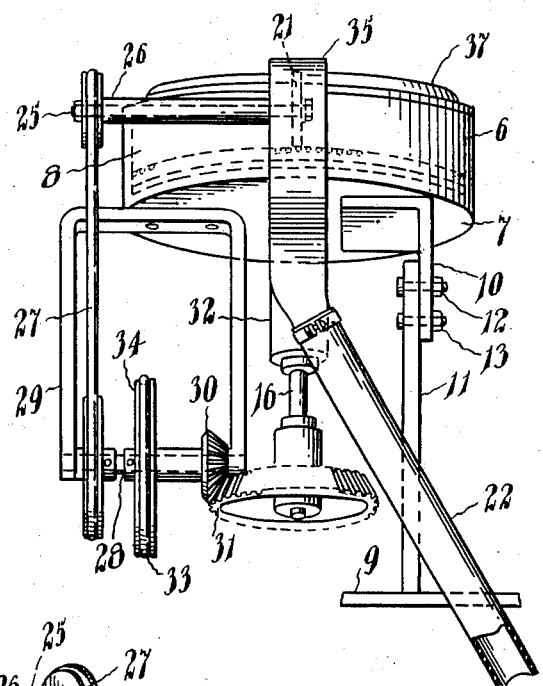
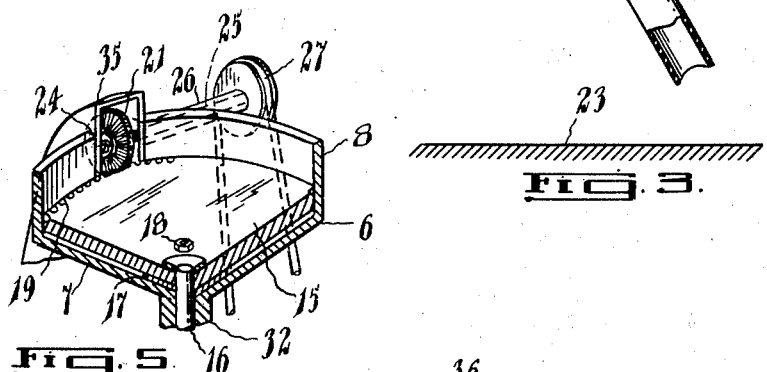
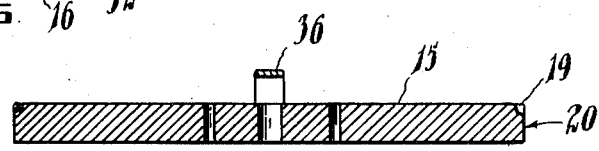
INVENTOR
RUSSELL DOUGHERTY
By Frederick C. Bromley
ATTY.

Patented Sept. 4, 1951

2,566,406

UNITED STATES PATENT OFFICE 2,566,406

SEED FEEDING DISK WITH EJECTOR BRUSH

Russell Dougherty, Blyth, Ontario, Canada

Application June 20, 1949, Serial No. 100,285

2 Claims. (Cl. 222—225)

My invention appertains to improvements in machines for sowing seeds; and has for its general object of the production of a more efficient and reliable apparatus for sowing seeds uniformly in desired spacing.

Other objects of the invention are to provide a seeder which by virtue of its mechanical movement will ensure that seeds are sown singly and without waste of seeds, and one which is positive in its action and is possessed of few parts which are reliable in operation.

With these and other objects in view the invention consists in the novel combination and arrangement of parts comprehending a cup supported in tilted position and containing a rotary feed disc having a circular series of seed pockets. Due to the tilt of the cup the feed disc rotates in a plane at an angle to the vertical. Hence it has a low side and a high side with regard to its axis. Seeds are placed in the cup at the low side of the feed disc and in this way seeds lodge singly in the pockets at the low side and are carried to the high side by rotative movement of the disc. The disc is driven in any approved mode as by a traction drive for example. At the high side of the disc a brush is arranged to sweep the seeds from the pockets and into a funnel of a seed tube through which they gravitate on to the ground.

A distinctive feature of the device is that the seed pockets are each of a capacity to hold a single seed, and the feed disc is detachably mounted in order that it can be removed by substituting a similar plate having pockets suitable for seeds of a different size.

Having briefly related the objects and nature of the invention, other objects and advantages will appear as the selected embodiment of the invention, shown in the accompanying drawings, is described in detail.

In the drawings, Fig. 1 is a plan view of the seeder.

Fig. 3 is a rear elevational view of the seeder.

Fig. 4 is a cross sectional view of the feed plate or disc in which the seed pockets are formed.

Fig. 5 is a perspective view in section showing how the brush engages the feed plate or disc to sweep seeds from the pocket thereof.

Figure 1:
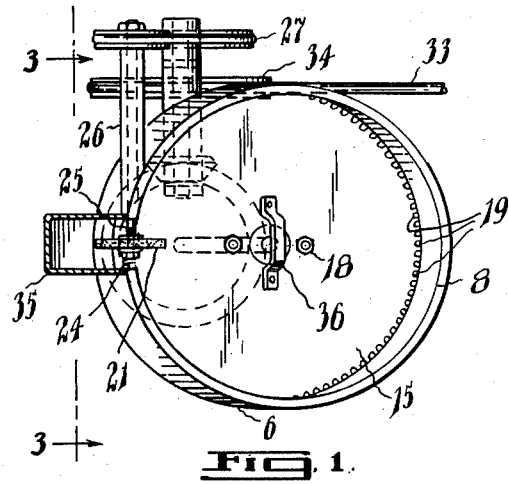
Figure 2:
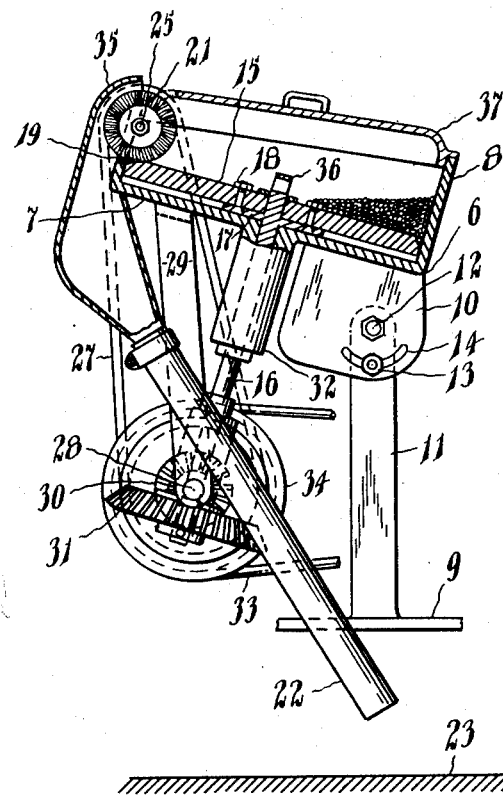
Fig. 2 is a side elevation thereof partly in section.

The seeder of my invention comprises a cup 6 constituting a holder for seeds to be sown and having a flat bottom wall 7 and circular side wall 8. The cup is rigidly supported on the wheeled frame of the machine as by suitable means. The wheeled frame is represented at 9, and it will be understood that it is of a conventional type which is hauled or otherwise moved along the ground. The means for supporting the cup 6 on the wheeled frame may comprise a lug 10 on the cup and a bracket 11 on said frame. Said cup is supported in a tilted position as clearly depicted in Fig. 2, so that seeds will gravitate to one side.

Desirably said cup is adjustable as to the angle of tilt or slope and any approved means may be employed to effect the adjustment. To this end the lug 10 may be secured to the bracket 11 by two bolts 12 and 13. In this arrangement the bolt 12 serves as a pivot when the nut thereon is loosened. The bolt 13 is engaged in an arcuate slot 14 which permits pivotal movement of the lug when this bolt is also loosened. It will be readily understood that the arrangement enables the cup to be adjusted to any angle within the limits of the arcuate slot 14 and that the cup can be locked in set position by tightening the nuts on the bolts 12 and 13.

A feed plate or disc 15 is rotatably mounted in said cup, by means of a spindle 16. Said feed plate conforms in diameter to the inside diameter of the cup and it is made a snug running fit within the bottom portion of the side wall 8. A central hole enables the feed plate to fit loosely on the upper end of the spindle. The feed plate is attached to the spindle by a collar 17 and fasteners 18. The fasteners are shown as consisting of bolts and nuts, which enable the feed plate to be removed as occasion requires.

The upper edge portion of the feed plate is provided with a continuous circular series of indents 19 constituting seed pockets, each of a size to hold a seed. The pockets are open to the edge face 20 of the feed plate and therefore the surrounding inner surface of the cup-wall 8 supplements the indents in forming the pockets to contain seeds.

Since the cup is supported in a tilted position it has a low side and a high side. Seeds are placed in a cup at its low side—see Fig. 2—and the bulk of the seeds remain at this side during operation of the seeder by reason of gravity. Seeds gravitate into the pockets at the low side from the source of supply and are carried to the high side by rotation of the feed plate. In this way the pockets at said low side are filled and kept filled with seeds until the supply of seeds is exhausted from within the cups. As the seeds are carried to the high side they are dispensed therefrom by a rotary brush 21 into a delivery tube 22 by which they are deposited on to the ground, which is represented at 23 in Fig. 2.

Said brush operates in a plane radially of the feed plate and it is arranged in an opening 24 in the wall 8 with its periphery in wiping contact with the pockets as they pass under the brush. According to the arrangement the brush sweeps the seeds from the engaged pockets in a direction outwardly of the cup. The brush is mounted on a horizontal shaft 25 journalled in a bearing 26 on the cup. Said shaft is driven by a drive connection at a suitable speed relative to movement of the feed plate. In the present instant the drive mechanism comprises a belt and pulley connection 27 with a jack shaft 28 supported by a bracket 29 and provided with a bevel pinion 30 in mesh with a bevel gear 31 keyed or otherwise fastened on the spindle 16. The brush could of course be driven in any other approved manner. Said spindle is journalled in an axial boss 32 on the cup and has a driving connection with a source of motive power. This driving connection is illustrated as a belt and pulley connection 33 comprising a pulley 34 on the jack shaft 28. The source of motive power is not represented in the drawings but it may consist of a traction drive which is a common expedient and therefore need not be further described.

From what has been recounted it will be clear that as the seeder is caused to traverse the ground the feed plate carries seeds one after another to the brush in a continuous and uniform manner and at a rate which is predetermined to sow them in desired spacing. As seeds are expelled from the pockets by the operation of the brush they gravitate through the delivery tube which leads to the ground as is common in the art. Desirably the upper end of the delivery tube is provided with a receiver 35 shaped to form a guard about the outer portion of the brush and at the opening in the cup. The pockets in the feed plate are each of a capacity to contain a single seed and the feed plate is made removable so that it can be detached and replaced by a similar feed plate having pockets for seeds of a different size.

The feed plate may have a suitable bail 36 for facilitating its removal, and the cup may have a cover or lid as denoted at 37.

Obviously such changes and variations in the details of the structure can be resorted to as fairly comes within the scope of the appended claims.

What I claim is:

1. In a seeder, a cup having a circular side wall provided with a local cut-away portion forming a discharge opening, a circular feed plate in said cup and rotatable about the central axis thereof, said feed plate having a peripheral edge and being a running fit in said cup such that seeds may not drop between it and said side wall, the upper face of said feed plate being disposed above the bottom of said discharge opening and there being a circular series of notches therein which are open to said peripheral edge and form pockets into which seeds gravitate from a source of supply, a rotary brush mounted in said discharge opening and engaged with said feed plate to brush seeds out of said pockets while said feed plate is rotating, and means for turning said feed plate and said brush.

2. A seeder as defined in claim 1, and in which the cup and the feed plate are disposed in an inclined position to provide a high side and a low side, and in which the discharge opening and the brush are disposed at said high side.

RUSSELL DOUGHERTY.

REFERENCES CITED

The following references are of record in the file of this patent:

UNITED STATES PATENTS

| Number | Name | Date |
|--------|------|------|
| 327,011 | Norton | Sept. 29, 1885 |
| 1,566,187 | Fifer | Dec. 15, 1925 |
| 2,054,552 | Wakeham | Sept. 15, 1936 |